(12) United States Patent
Yoshino (10) Patent No.: US 10,230,903 B2
(45) Date of Patent: Mar. 12, 2019

(54) IMAGE PICKUP APPARATUS HAVING IMAGE SENSOR CAPABLE OF OUTPUTTING PARALLAX IMAGE SIGNAL, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Eiji Yoshino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/675,199

(22) Filed: Aug. 11, 2017

(65) Prior Publication Data
US 2018/0063413 A1 Mar. 1, 2018

(30) Foreign Application Priority Data
Aug. 25, 2016 (JP) .................................. 2016-164594

(51) Int. Cl.
*H04N 5/238* (2006.01)
*G03B 39/00* (2006.01)
(Continued)

(52) U.S. Cl.
CPC .............. *H04N 5/238* (2013.01); *G03B 7/00* (2013.01); *G03B 7/006* (2013.01); *G03B 17/46* (2013.01);
(Continued)

(58) Field of Classification Search
CPC .. H04N 5/23212; H04N 5/235; H04N 5/2351; H04N 5/238; G03B 7/00–7/02;
(Continued)

(56) References Cited

U.S. PATENT DOCUMENTS 7,925,153 B2 * 4/2011 Kubota .................. H04N 5/232
348/362
8,175,447 B2 * 5/2012 Takaiwa ................. G03B 17/00
396/111

(Continued)

FOREIGN PATENT DOCUMENTS

| JP | 2011022386 A | 2/2011 |
| JP | 2013175919 A | 9/2013 |
| JP | 2016018033 A | 2/2016 |

*Primary Examiner* — Lin Ye
*Assistant Examiner* — Chriss Yoder, III
(74) *Attorney, Agent, or Firm* — Rossi, Kimms & McDowell LLP (57) ABSTRACT

An image pickup apparatus being capable of performing a photometry process under a suitable condition and of achieving high-speed continuous photographing. A first drive, which accumulates and reads an electric charge with an image sensor for a photometry process, and a second drive, which accumulates and reads an electric charge to obtain an image signal for a static image, are alternately repeated during continuous photographing. A photometry process is performed based on the electric charge read by the first drive. An aperture value for obtaining the image signal of an (N+1)th frame is calculated based on a result of the photometry process during accumulation for obtaining the image signal of an N-th frame. A control unit controls a diaphragm based on the calculated aperture value and a predetermined aperture value during reading of the electric charge for obtaining the image signal of the N-th frame.

17 Claims, 5 Drawing Sheets

(51) Int. Cl.
*H04N 5/232* (2006.01)
*G03B 7/00* (2014.01)
*G03B 17/46* (2006.01)

(52) U.S. Cl.
CPC ......... *G03B 39/00* (2013.01); *H04N 5/23212* (2013.01)

(58) Field of Classification Search
CPC ........ G03B 7/085; G03B 7/087; G03B 7/095; G03B 7/097; G03B 39/00
See application file for complete search history.

(56) References Cited

U.S. PATENT DOCUMENTS

2010/0284679 A1\* 11/2010 Mizukami ................ G03B 7/08
396/257
2018/0063416 A1\* 3/2018 Kimoto ................ H04N 1/2145

\* cited by examiner

IMAGE PICKUP APPARATUS HAVING IMAGE SENSOR CAPABLE OF OUTPUTTING PARALLAX IMAGE SIGNAL, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus having an image sensor that is capable of outputting a parallax image signal, a control method therefor, and a storage medium storing a control program therefor.

Description of the Related Art

There is a known image pickup apparatus that is capable of photographing continuously while adjusting focus and an exposure in response to a motion and change of an object. Such an image pickup apparatus performs a focus process for obtaining information about an object distance and a photometry process for detecting brightness of an object in addition to an image pickup process for a static image during continuous photographing, and adjusts focus and an exposure by driving a focusing lens and a diaphragm using results of these processes.

There are the following methods as the focus process and the photometry process. There is a method of performing a focus process of what is called phase difference detection method. That is, an electric charge is accumulated and read in a predetermined drive mode using an image sensor capable of outputting a parallax image signal. Distance and brightness of an object are calculated according to information obtained. Since the method of measuring distance using this image sensor completes the focus process more rapidly than a contrast AF (a method of adjusting focus by detecting edges in images photographed in a plurality of times while moving a focusing lens), high-speed focusing is available. Hereinafter, a case where continuous photographing is performed using results of the focus process and photometry process with the above-mentioned image sensor will be described.

The image pickup apparatus drives the image sensor for a static image so as to accumulate and read an electric charge, obtains static image data for record, then drives a sensor for the focus and photometry processes so as to accumulate and read an electric charge, and obtains data for the focus and photometry processes. At this time, the image pickup apparatus finds the distance and the brightness of the object by performing a predetermined arithmetic process using the obtained information. Then, the image pickup apparatus adjusts the focus by driving the focusing lens according to the distance to the object, determines a suitable exposure value corresponding to the brightness of the object, and drives a diaphragm on the basis of the exposure value. The image pickup apparatus is capable of photographing continuously while adjusting the focus and exposure in response to a motion and change of an object by repeating the above-mentioned operations. When the image pickup apparatus photographs continuously with this method, it is necessary to perform various processes for adjusting the focus and exposure whenever the image pickup process for a static image is performed, which slows down the speed of the continuous photographing.

Japanese Laid-Open Patent Publication (Kokai) No. 2016-18033 (JP 2016-18033A) discloses an image pickup apparatus employing an image sensor that is capable of a phase difference AF. The image pickup apparatus finds distance and brightness of an object using the data obtained by the image pickup process for a static image, and keeps the speed of the continuous photographing so as not to slow down by driving a focusing lens and diaphragm while reading an electric charge accumulated for a static image.

However, the technique disclosed in the above-mentioned publication may not perform a suitable focus process depending on an exposure condition for a static image. When the focus process of the phase difference detection method with the image sensor is performed, accuracy of the focus process is lowered as the aperture diameter of the diaphragm decreases. Accordingly, when the aperture diameter of the diaphragm at the time of the image pickup process for a static image becomes smaller than a predetermined value, the accuracy of the focus process is lowered and necessary evaluation value data may not be obtained appropriately.

That is, when the diaphragm is controlled so as to be the aperture diameter for the next static image while reading the electric charge for the static image like the technique described in the above-mentioned publication, the period between frames (between static images) will be shortened. However, when the aperture diameter of the diaphragm in that case is smaller than the predetermined value, the accuracy (performance) of the focus process will be lowered. On the other hand, when the diaphragm is controlled so that the aperture diameter becomes larger than the predetermined value uniformly at the time of obtaining data for the focus and photometry processes, the accuracy of the focus process becomes high. However, since the diaphragm needs to be changed to the aperture diameter for the next static image for accumulating an electric charge for the next static image after that, the period between frames may become long, and high-speed continuous photographing becomes difficult.

SUMMARY OF THE INVENTION

The present invention provides an image pickup apparatus, a control method therefor, and a storage medium storing a control program therefor, which are capable of performing a focus process and photometry process under suitable conditions and of achieving high-speed continuous photographing.

Accordingly, a first aspect of the present invention provides an image pickup apparatus including an image sensor, a drive unit configured to alternately repeat a first drive, which accumulates and reads an electric charge with the image sensor in order to obtain a first image signal used for at least one of a focus process and a photometry process, and a second drive, which accumulates and reads an electric charge with the image sensor in order to obtain a second image signal for a static image, during continuous photographing that obtains static images continuously using the image sensor, a photometry unit configured to perform the photometry process based on the electric charge read by the first drive of the image sensor, a calculation unit configured to start calculating an aperture value for obtaining the second image signal of an (N+1)th frame based on a result of the photometry process by the photometry unit during accumulation of the electric charge for obtaining the second image signal of an N-th frame by the second drive, and a control unit configured to control a diaphragm based on the calculated aperture value with the calculation unit and a predetermined aperture value during reading of the electric charge for obtaining the second image signal of the N-th frame by the second drive of the image sensor.

Accordingly, a second aspect of the present invention provides a control method for an image pickup apparatus having an image sensor, the control method including performing a first drive, which accumulates and reads an electric charge with the image sensor in order to obtain a first image signal used for at least one of a focus process and a photometry process, and a second drive, which accumulates and reads an electric charge with the image sensor in order to obtain a second image signal for a static image, alternately, during continuous photographing that obtains static images continuously using the image sensor, performing the photometry process based on the electric charge read by the first drive of the image sensor, starting calculation of an aperture value for obtaining the second image signal of an (N+1)th frame based on a result of the photometry process during accumulation of the electric charge for obtaining the second image signal of an N-th frame by the second drive, and controlling a diaphragm based on the aperture value calculated and a predetermined aperture value during reading of the electric charge for obtaining the second image signal of the N-th frame by the second drive.

Accordingly, a third aspect of the present invention provides a non-transitory computer-readable nonvolatile memory storing a control program causing a computer to execute the control method of the second aspect.

Accordingly, a fourth aspect of the present invention provides an image pickup apparatus including an image sensor, a drive unit configured to alternately perform a first drive, which accumulates and reads an electric charge with the image sensor in order to obtain a first image signal used for at least one of a focus process and a photometry process, and a second drive, which accumulates and reads an electric charge with the image sensor in order to obtain a second image signal for a static image, during continuous photographing that obtains static images continuously using the image sensor, a photometry unit configured to perform the photometry process based on the electric charge read by the first drive of the image sensor, a calculation unit configured to calculate an aperture value for obtaining the second image signal of an (N+1)th frame based on a result of the photometry process by the photometry unit, and a control unit configured to control a diaphragm based on the calculated aperture value with the calculation unit and a predetermined aperture value during reading of the electric charge for obtaining the second image signal of the N-th frame by the second drive of the image sensor. The control unit controls the diaphragm so as to become the calculated aperture value and the drive unit performs the second drive immediately after the first drive when the calculated aperture value is more open side than the predetermined aperture value. The drive unit performs the first drive after the control unit controls the diaphragm so as to become the predetermined aperture value, and then the drive unit performs the second drive after the control unit controls the diaphragm so as to become the calculated aperture value, when the calculated aperture value is not more open side than the predetermined aperture value.

Accordingly, a fifth aspect of the present invention provides a control method for an image pickup apparatus having an image sensor, the control method including performing a first drive, which accumulates and reads an electric charge with the image sensor in order to obtain a first image signal used for at least one of a focus process and a photometry process, and a second drive, which accumulates and reads an electric charge with the image sensor in order to obtain a second image signal for a static image, alternately, during continuous photographing that obtains static images continuously using the image sensor, performing the photometry process based on the electric charge read by the first drive of the image sensor, calculating an aperture value for obtaining the second image signal of an (N+1)th frame based on a result of the photometry process, controlling a diaphragm so as to become the calculated aperture value during reading of the electric charge for obtaining the second image signal of an N-th frame by the second drive of the image sensor, and performing the second drive immediately after the first drive, when the calculated aperture value is more open side than the predetermined aperture value, and performing the first drive after controlling the diaphragm so as to become the predetermined aperture value during reading of the electric charge for obtaining the second image signal of an N-th frame by the second drive of the image sensor, and then performing the second drive after controlling the diaphragm so as to become the calculated aperture value, when the calculated aperture value is not more open side than the predetermined aperture value.

Accordingly, a sixth aspect of the present invention provides a non-transitory computer-readable nonvolatile memory storing a control program causing a computer to execute the control method of the fifth aspect.

According to the present invention, the focus process and photometry process are performed under suitable conditions and the high-speed continuous photographing is achieved.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
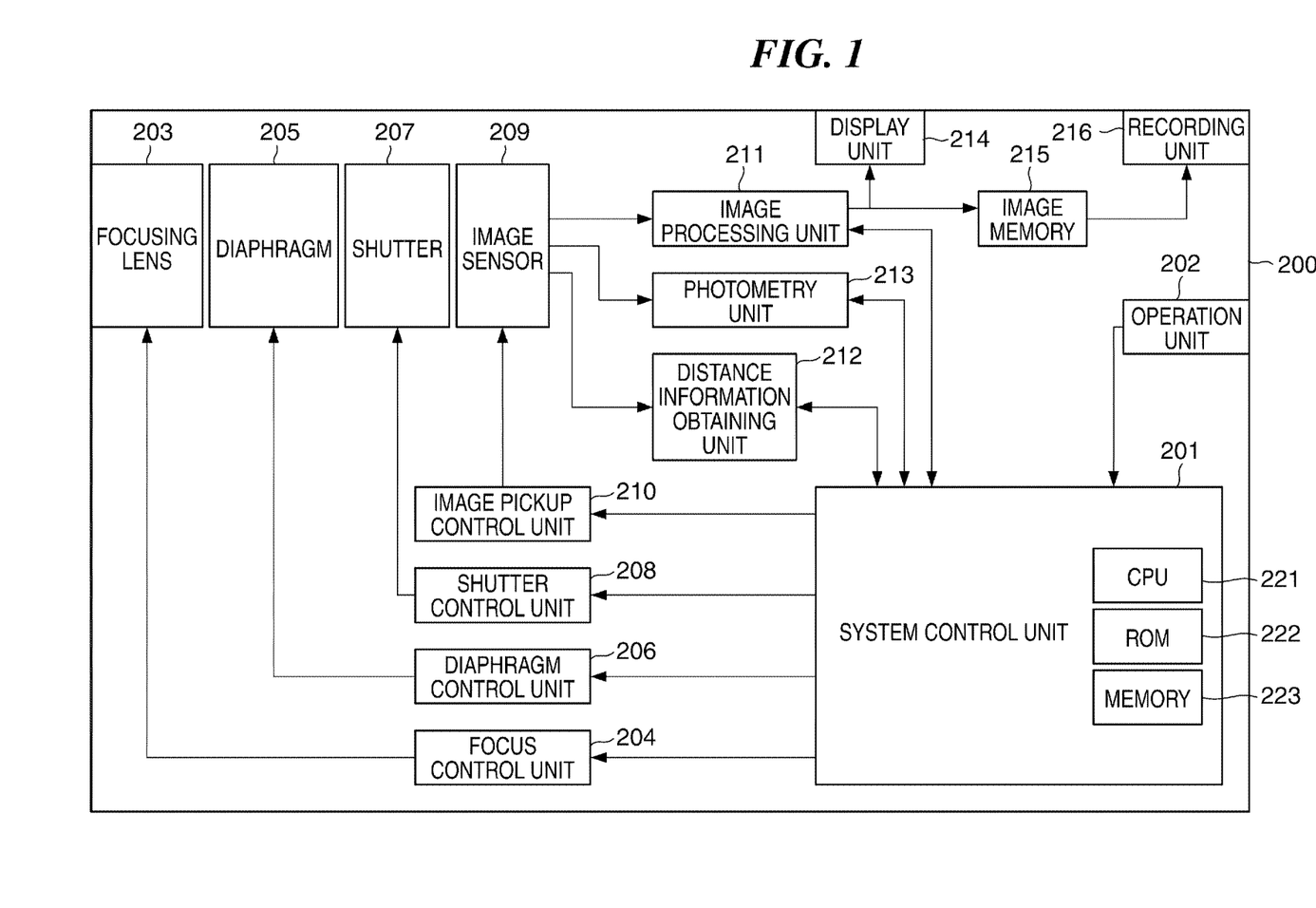
FIG. 1 is a block diagram schematically showing an image pickup apparatus according to a first embodiment of the present invention.

FIG. 1 is a block diagram schematically showing an image pickup apparatus according to a first embodiment of the present invention. This image pickup apparatus 200 has an image sensor 209 that is capable of outputting not only a regular image signal for record but also a parallax image signal. Accordingly, the image pickup apparatus 200 enables what is called imaging plane phase difference AF (autofocus) on the basis of the parallax image signal output from the image sensor 209. It should be noted that the image pickup apparatus 200 enables not only regular photographing for obtaining a static image but also continuous photographing for obtaining static images (frames) continuously. A system control unit 201 has a CPU (MPU) 221, a ROM 222, and a memory 223 that consists of a DRAM or an SRAM. Various programs, such as a control program, are stored in the ROM 222. The memory 223 is used as a work memory when the CPU 221 runs a program. The system control unit 201 runs various programs to control blocks of the image pickup apparatus 200, and to control data transfer between the blocks. Moreover, the system control unit 201 controls the blocks of the image pickup apparatus 200 in response to operation signals from an operation unit 202 that receives an operation from a user.

The operation unit 202 has switches for inputting various operations relevant to photographing, such as a power button and a shutter button. The operation unit 202 has a menu indication button, a determination button, cursor keys, a pointing device, a touch panel, etc., and sends operation signals to the system control unit 201 when these keys and buttons are operated by the user. A focusing lens 203 is a lens for adjusting focus of an optical image formed on the image sensor 209. When receiving an instruction from the system control unit 201, a focus control unit 204 controls the focusing lens 203 on the basis of object distance information obtained by a distance information obtaining unit 212. A diaphragm 205 adjusts an amount of light taken into the image sensor 209, and operates in order to obtain an image with suitable exposure. When receiving an instruction from the system control unit 201, a diaphragm control unit 206 controls the diaphragm 205 on the basis of brightness information about an object obtained by a photometry unit 213.

A shutter 207 operates in order to intercept the light taken into the image sensor 209. A shutter control unit 208 controls the shutter 207 in response to an instruction from the system control unit 201. In a case of static image photographing, the shutter control unit 208 controls the shutter 207 so as to open the shutter 207 in order to take light into the image sensor 209 during a period for accumulating an electric charge, and to close the shutter 207 during a period for reading an accumulated charge. It should be noted that the accumulated charge may be read while closing the shutter 207 or may be read by electronic shutter control while opening the shutter 207.

The image sensor 209 as an image sensor is provided with a CMOS sensor and its peripheral circuit, converts an optical image of an object taken in with the lens into an image signal, applies analog-to-digital conversion to the image signal, and sends a converted digital signal to an image processing unit 211. There are a plurality of drive systems for the image sensor 209. The drive systems include a "focus-and-photometry-process sensor drive" (a first drive) that obtains evaluation values for obtaining information about distance from the image pickup apparatus 200 to an object and information about brightness of the object. In this focus-and-photometry-process sensor drive, an electric charge is accumulated and read in order to obtain a first image signal used in focus and photometry processes. Moreover, the drive systems include a "static-image sensor drive" (a second drive) that obtains a static image for record (second image signal) in response to a photographing instruction from a user. In this static-image sensor drive, an electric charge is accumulated and read in order to obtain a static image (second image signal). In addition, there is a "through-image sensor drive" (a third drive) that generates images continuously by a predetermined frame rate for framing before photographing.

The image sensor 209 is an imaging plane phase difference type, and is provided with a microlens array (not shown) as a pupil-division means at the front side (object side) and a two-dimensional array configuration of unit pixel cells corresponding to micro lenses. Then, the image sensor 209 picks up a formed object image with photoelectrical conversion, sequentially converts electric charges accumulated in PDs constituting the unit pixel cells into voltage signals at the time of read control, and outputs them to an A/D convertor (not shown). A unit pixel cell has a pair of divided-pupil pixels (hereinafter referred to as a divided pixel (first photoelectric conversion section) "a" and a divided pixel (second photoelectric conversion section) "b"). A focus process (a process for obtaining information about object distance) is performed by detecting a focus deviation amount (defocus amount) from a deviation amount between two images on the basis of phase difference between the divided pixels "a" and "b". A photographed image for a static image is generated by adding signals from the divided pixels "a" and "b". It should be noted that an image sensor that has pixels for photographing and pixels for focus detection arranged discretely may be used by employing a well-known configuration as shown in JP 2016-18033A.

When the image sensor 209 is driven for the focus process, the evaluation value for calculating the object distance is obtained. Moreover, the brightness of the object is simultaneously measured by the sensor drive at this time. That is, both the processes for focus and photometry are executable on the basis of the parallax image signal obtained by the first drive of the image sensor 209. When the image sensor 209 performs the focus process, the smaller the aperture diameter of the diaphragm is, the lower the accuracy of the focus process is. Accordingly, an aperture value (F-number) about the aperture diameter of the diaphragm 205 is adjusted by the focus-and-photometry-process sensor drive so as to be equal to a predetermined aperture value (for example, F8) or smaller in order to perform a highly accurate focus process. The evaluation values obtained by the focus-and-photometry-process sensor drive are sent to the distance information obtaining unit 212 and the photometry unit 213.

The image pickup control unit 210 controls switching of the drive system of the image sensor 209 and timings of accumulation and reading of electric charges. The image processing unit 211 applies an image-quality adjusting process that adjusts white balance, colors, brightness, etc. on the basis on a setting value to an input digital signal. Then, the image signal processed by the image processing unit 211 is sent to a display unit 214 as an image for displaying, and is encoded to a compressed image signal that is sent to an image memory 215 for recording. Furthermore, the image processing unit 211 is capable of extracting object information in the image by applying a predetermined image analysis process to the input digital signal. For example, the image processing unit 211 determines whether an image includes an object, such as a person (face) or a substance, and determines a position of the object within the image. The extracted object information is sent to the system control unit 201.

A distance information obtaining unit 212 obtains the object distance on the basis of the evaluation value obtained by the focus-and-photometry-process sensor drive of the image sensor 209. As mentioned above, the system control unit 201 calculates the focus deviation amount from the deviation amount between the two images obtained from the image sensor 209, and obtains the object distance. The photometry unit 213 performs the photometry process (i.e., measures the brightness of the object) on the basis of the evaluation value obtained by the focus-and-photometry-process sensor drive of the image sensor 209. Specifically, the photometry unit 213 measures the brightness of the object by finding the brightness in the entire image or the brightness in a predetermined area on the basis of the image signal obtained from the image sensor 209 using an integrating circuit etc.

The display unit 214 displays an image according to an image signal sent from the image processing unit 211, an operation screen (a menu screen) for operating the image pickup apparatus 200, etc. The display units 214 is a display device, such as an LCD, an organic EL display, and an electronic paper. The image memory 215 temporarily stores the compressed image signals (image data) that are encoded for recording, and sequentially writes the signals to the recording unit 216. Then, the written image data is deleted from the image memory 215 so as to be store the following image data. The image memory 215 consists of a DRAM etc. Since the more number of record images are temporarily storable as the capacity increases, high-speed continuous photographing is maintained even if the time of writing to the recording unit 216 becomes long. The recording unit 216 records the compressed image signals stored in the image memory 215 to a storage medium. The storage medium used may be built in the image pickup apparatus or may be detachable as long as the compressed image signals and various kinds of data generated by the image pickup apparatus 200 are recordable. The storage medium of any system, such as a hard disk, an optical disk, a magnetic-optical disk, a CD-R, a DVD-R, a magnetic tape, a nonvolatile semiconductor memory, and a flash memory, may be used.

Figure 2:
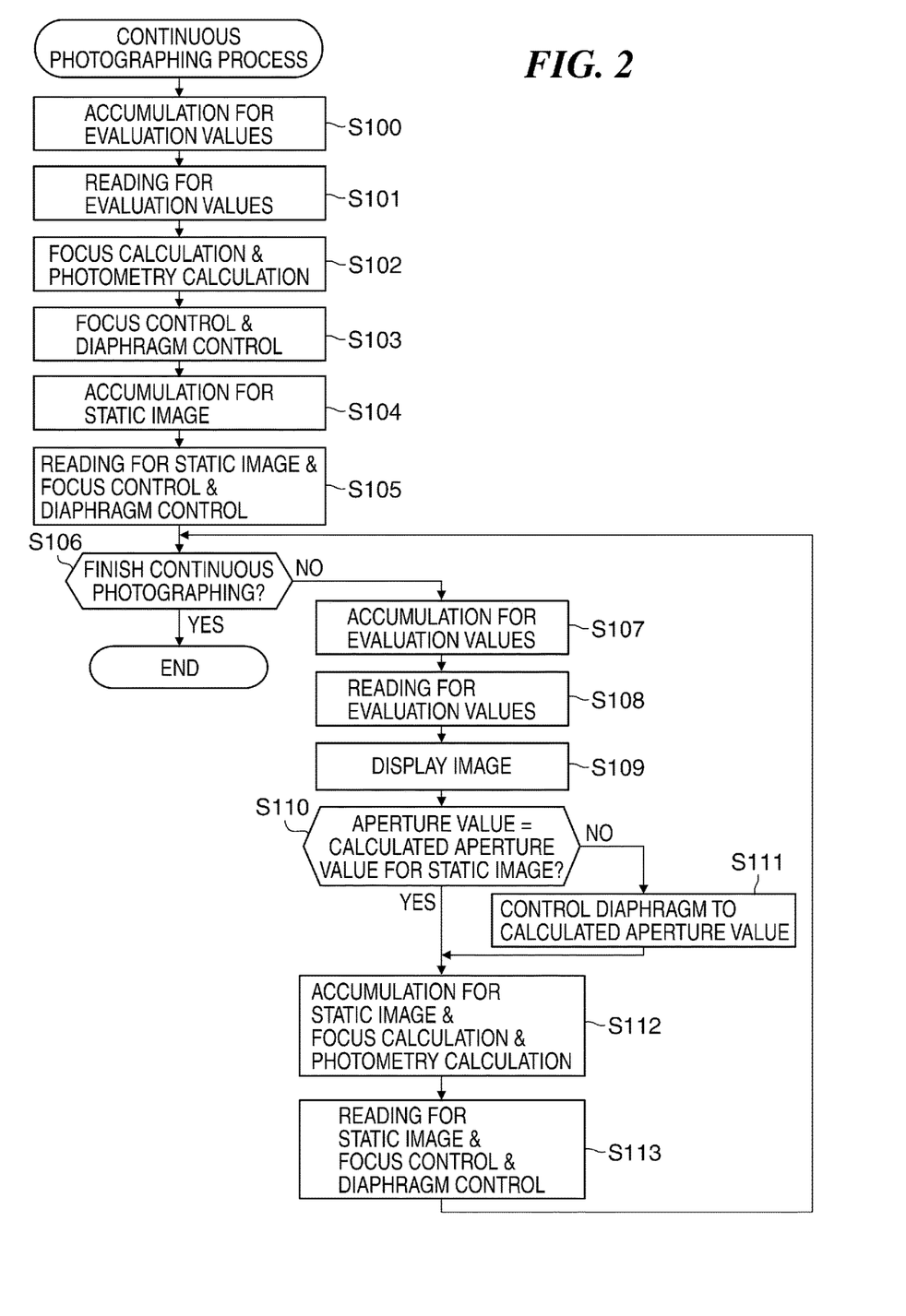
FIG. 2 is a flowchart showing a continuous photographing process performed by the image pickup apparatus shown in FIG. 1.
Figure 3:
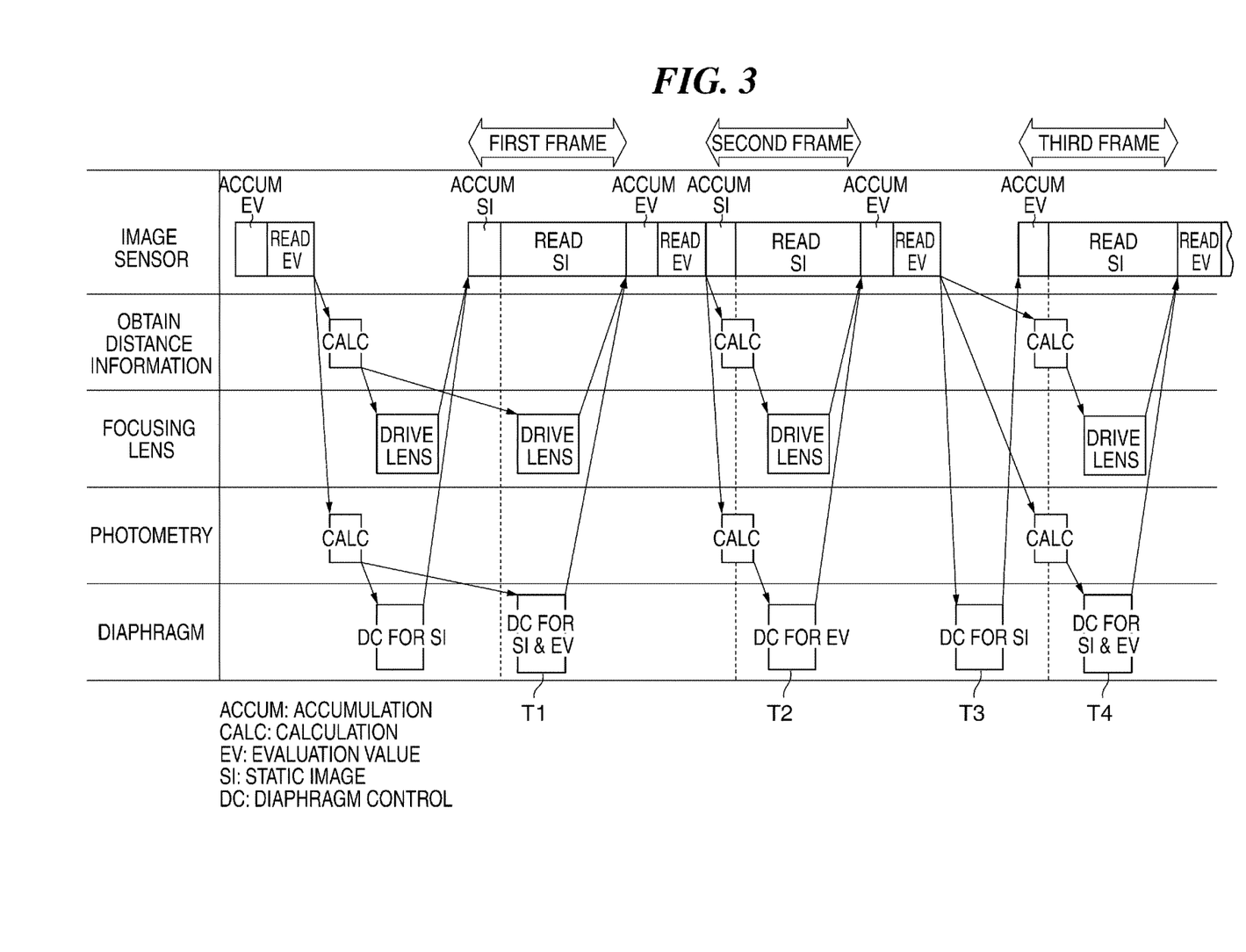
FIG. 3 is a timing chart of the continuous photographing process performed by the image pickup apparatus shown in FIG. 1.

FIG. 2 is a flowchart showing a continuous photographing process performed by the image pickup apparatus 200 shown in FIG. 1. FIG. 3 is a timing chart of the continuous photographing process performed by the image pickup apparatus 200 shown in FIG. 1. Operations of the continuous photographing will be described with reference to FIG. 2 and FIG. 3. As shown in FIG. 3, when photographing continuously, the system control unit 201 drives the image sensor 209 by repeating the focus-and-photometry sensor drive and the static-image sensor drive alternately. In the process in FIG. 2, the system control unit 201 achieves the functions as the drive unit, computation unit, and control unit in the present invention.

The process of the flowchart in FIG. 2 is achieved when the CPU 221 runs the program stored in the ROM 222. When a user presses a shutter button included in the operation unit 202 in a continuous photographing mode, a start instruction of the continuous photographing is sent to each block of the image pickup apparatus 200, and the continuous photographing process in FIG. 2 is started.

First, in step S100, the system control unit 201 drives the image sensor 209 by the focus-and-photometry-process sensor drive so as to accumulate electric charges in order to obtain the evaluation values for the focus and photometry processes. In the next step S101, the system control unit 201 reads the electric charges accumulated in the image sensor 209, and obtains the evaluation values for the focus and photometry processes. At this time, the electric charges are read by electronic shutter control while keeping the shutter 207 open. It should be noted that the system control unit 201 may read the electric charges by controlling the shutter 207 to close with the shutter control unit 208 without using the electronic shutter control. In such a case, the shutter 207 is controlled to open after reading.

In the step S102, the system control unit 201 makes the distance information obtaining unit 212 perform a focus calculation using the evaluation value for the focus process and makes the photometry unit 213 perform a photometry calculation using the evaluation value for the photometry process. Thereby, a focus result and a photometry result are output. The focus calculation and photometry calculation are performed so as to adjust the focus and exposure optimally to the object (a person, face, or substance) detected on the basis of the object information extracted by the image processing unit 211. For example, the distance information obtaining unit 212 calculates the object distance information (focus position) so as to focus on the detected object. Moreover, the photometry unit 213 enlarges the weighting of photometry to the object position with which a focus is united, and calculates the brightness information about an object. Thus, since the detection results about the object are used for both the focus calculation and photometry calculation simultaneously, the position to which is focused agrees with the position to which the exposure is adjusted, which enables to obtain a more suitable image.

In step S103, the system control unit 201 controls the focusing lens 203 through the focus control unit 204 on the basis of the object distance information obtained by the focus calculation so as to adjust the focus for the static image photographing of a first frame. Moreover, the system control unit 201 calculates the aperture value on the basis of the brightness information about the object obtained by the photometry calculation, and controls the diaphragm 205 with the control unit 206 so as to be the calculated aperture value to adjust the exposure suitable to the static image photographing of the first frame (diaphragm control). It should be noted that the focusing lens 203 does not have to move when the focusing lens 203 has been already located at the optimal focus position for the static image photographing of the first frame. Moreover, when the diaphragm 205 has been already set at the diaphragm position optimal to the static image photographing of the first frame, or when the photographing with the optimal exposure will be performed by adjusting the various photographing parameters, such as the shutter speed and sensor sensitivity, without controlling the diaphragm 205, it is not necessary to change the aperture diameter of the diaphragm 205.

In step S104, the system control unit 201 drives the image sensor 209 by the static-image sensor drive, and accumulates an electric charge in order to obtain image data for a static image. In step S105, the system control unit 201 controls the shutter 207 to close with the shutter control unit 208, reads the electric charge for a static image accumulated in the image sensor 209, and obtains the image data for the static image. Moreover, the system control unit 201 predicts the focus position of the object at a photographing timing of a second frame during the reading of the electric charge for the static image on the basis of the result of the focus process obtained in the step S102 or the result obtained before starting the continuous photographing. Then, the system control unit 201 moves the focusing lens 203 to the predicted focus position. For example, the system control unit 201 calculates the movement speed of the object on the basis of a result a1 of the focus process at time t1 before starting the continuous photographing, time t2 at which the evaluation value is obtained in the step S100, and a result a2 of the focus process obtained at the time t2. Specifically, the system control unit 201 calculates change (a2−a1) in the object distance and transit time (t2−t1), and calculates the movement speed of the object from these. Then, the system control unit 201 determines the focus position for the static image of the second frame by predicting the change of the object distance on the basis of the calculated movement speed and time until the photographing timing of the second frame, and moves the focusing lens 203 to the focus position concerned.

During the reading of the electric charge for the static image, the system control unit 201 controls the diaphragm 205 so as to become the aperture value suitable for obtaining the evaluation value in step S107 mentioned later (the diaphragm control) on the basis of the result of the photometry process obtained in the step S102. Specifically, the system control unit 201 determines "an aperture value that is actually used for obtaining an evaluation value" (hereinafter referred to as a "determined aperture value"), and controls to change the aperture diameter of the diaphragm 205 so as to become the determined aperture value. Each aperture value is defined as follows.

(a) The "predetermined aperture value" is a limit value of the aperture value that allows high-precision phase difference AF, and is set to F8 in the first embodiment.

(b) An "aperture value suitable for obtaining an evaluation value" is equal to the predetermined aperture value or is more open side than the predetermined aperture value.

(c) An "aperture value for photographing a static image" (hereinafter referred to as a "calculated aperture value") is calculated in the step S103 or step S113 mentioned later.

(d) The "determined aperture value" is determined by comparing the predetermined aperture value and the calculated aperture value.

Specifically, when the "calculated aperture value" is less than the "predetermined aperture value", the calculated aperture value is determined as the determined aperture value. Otherwise, the predetermined aperture value is determined as the determined aperture value. For example, when the calculated aperture value for the static image photographing of the following frame is F4, F4 becomes the determined aperture value because F4 is more open side than the predetermined aperture value (F8). Moreover, when the calculated aperture value for the static image photographing of the following frame is F11, F8 becomes the determined aperture value because F11 is a smaller aperture side than the predetermined aperture value (F8). In the example shown in FIG. 3, the system control unit 201 determines F4 as the determined aperture value and controls the diaphragm 205 so as to become the aperture value F4 in a process T1 during the reading of the electric charge for the static image of the first frame. In the description, F4 corresponds to the "aperture value suitable for obtaining an evaluation value" and the calculated aperture value for the static image photographing. Accordingly, a suitable evaluation value is obtained, and it is unnecessary to re-change the aperture value to the calculated aperture value for the static image photographing immediately after obtaining the evaluation value, which does not cause a wasteful period.

In step S106, the system control unit 201 determines whether the continuous photographing will be finished by checking whether the user is continuously pressing the shutter button of the operation unit 202. Then, when finishing the continuous photographing, the system control unit 201 finishes the process in FIG. 2. When not finishing the continuous photographing, the system control unit 201 proceeds with the process to step S107. In step S107, the system control unit 201 drives the image sensor 209 by the focus-and-photometry-process sensor drive so as to accumulate electric charges in order to obtain the evaluation values for the focus and photometry processes. In this time, the aperture value of the diaphragm 205 is the value that was determined and controlled in the preceding step S105 or S113. In the next step S108, the system control unit 201 reads the electric charges accumulated in the image sensor 209, and obtains the evaluation values for the focus and photometry processes. Then, in step S109, the system control unit 201 generates a display image with the image processing unit 211 from the data about the evaluation values obtained in the step S108, and displays the display image on the display unit 214. Since the latest photographed image is displayed in the step S109 in the continuous photographing, the user easily photographs while checking an object.

In step S110, the system control unit 201 determines whether the current aperture value of the diaphragm 205 is the calculated aperture value for the static image photographing. The current aperture value of the diaphragm 205 is the determined aperture value determined in the preceding step S105 or S113. Accordingly, when the calculated aperture value was determined as the determined aperture value, the result of the step S110 becomes YES, and the process proceeds to step S112. However, when the predetermined aperture value was determined as the determined aperture value, the result of the step S110 becomes NO, and the process proceeds to step S111.

In the step S111, the system control unit 201 starts the diaphragm control so that the aperture value of the diaphragm 205 becomes the calculated aperture value in order to fit to obtain a static image. In the example shown in FIG. 3, the calculated aperture value for a third frame shall be F11. In this case, the system control unit 201 determines the predetermined aperture value (F8) as the determined aperture value in a process T2 (S113 mentioned later), and controls the diaphragm 205 so that the aperture value of the diaphragm 205 becomes F8 during the reading of the electric charge for the static image of the second frame. Accordingly, in this case, the system control unit 201 controls the diaphragm 205 so as to become the calculated aperture value (F11) in a process T3 (S111) before starting accumulation of an electric charge for a static image of a third frame. Thereby, suitable exposure is securable in the static image photographing of the third frame.

On the other hand, when a process 14 is performed, the process proceeds to the step S112 without passing through the step S111 in FIG. 3. In the process 14 (S113 mentioned later), the system control unit 201 controls the diaphragm 205 so as to become the determined aperture value (the calculated aperture value, for example, F4) during the reading of the electric charge for the static image of the third frame as with the process T1.

In the step S112, the system control unit 201 drives the image sensor 209 by the static-image sensor drive, and accumulates an electric charge in order to obtain image data for a static image. Moreover, the system control unit 201 makes the distance information obtaining unit 212 perform the focus calculation and makes the photometry unit 21 perform the photometry calculation using the evaluation values for the focus and photometry processes obtained most recently (in the step S108) in parallel to the accumulation of the electric charge. These calculation operations start during the accumulation of the electric charge for the static image. Thereby, the result of the focus calculation (process) and the result of the photometry process are output. It should be noted that the system control unit 201 may perform the focus calculation and photometry calculation while performing the diaphragm control started in the step S111, when the process passed through the step S111.

In step S113, the system control unit 201 controls the shutter 207 to close with the shutter control unit 208, reads the electric charge for the static image accumulated in the image sensor 209, and obtains the image data for the static image as with the step S105. Moreover, the system control unit 201 predicts the focus position of the object at a photographing timing of the next frame during the reading of the electric charge for the static image on the basis of the result of the focus process obtained in the step S112 or the result of the focus process obtained beforehand. Then, the system control unit 201 moves the focusing lens 203 to the predicted focus position. During the reading of the electric charge for the static image, the system control unit 201 controls the diaphragm 205 so as to become the aperture value suitable for obtaining the evaluation value in the next step S107 on the basis of the result of the photometry process obtained in the step S112. That is, the system control unit 201 determines the determined aperture value, and controls the diaphragm 205 so as to become the determined aperture value as with the step S105 (processes T2 and T4 in FIG. 3). Then, the process returns to the step S106.

Thus, the system control unit 201 determines the determined aperture value on the basis of the calculated aperture value for the static image photographing of the (N+1)th frame (N is a natural number) and the predetermined aperture value, and controls the diaphragm 205 so as to become the determined aperture value during the reading of the electric charge for the static images of the N-th frame. In the example in FIG. 3, the first frame, second frame, third frame, and fourth frame respectively correspond the N-th frame, (N+1)th frame, (N+2)th frame, and (N+3)th frame.

When the calculated aperture value for the second frame ((N+1)th frame) is F4, the determined aperture value is set to F4 in the process T1, and the diaphragm is controlled to F4 during the reading of the electric charge for the static image of the first frame (N-th frame) in the step S105. In this case, since the process is shifted to the immediately following focus-and-photometry-process sensor drive while keeping the aperture value F4, the static image photographing of the second frame is started without resetting the diaphragm, which does not lengthen a period between frames and contributes to the high-speed continuous photography. Moreover, when the calculated aperture value of the third frame ((N+2)th frame) is F11, the determined aperture value is set to F8 in the process T2, and the diaphragm 205 is controlled to F8 during the reading of the electric charge for the static image of the second frame ((N+1)th frame) in the step S113. Accordingly, the evaluation values are obtained under the suitable condition, and tracking performance for the focus and exposure is securable. After that, the diaphragm 205 is controlled to F11 in the process T3 before starting the accumulation of the electric charge for the static image of the third frame ((N+2)th frame) in the step S111. Thereby, suitable exposure is securable in the static image photographing of the third frame. Moreover, when the calculated aperture value of the fourth frame ((N+3)th frame) is F4, the determined aperture value is set to F4 in the process 14, and the diaphragm 205 is controlled to F4 during the reading of the electric charge for the static image of the third frame ((N+2)th frame) in the step S113. In this case, since the process is shifted to the immediately following focus-and-photometry-process sensor drive while keeping the aperture value F4, a period between frames does not become long.

According to the first embodiment, since the diaphragm is controlled during the reading of the electric charge for the static image of the N-th frame on the basis of the calculated aperture value for the static image photographing of the (N+1)th frame and the predetermined aperture value, the focus process and photometry process are performed under the suitable condition, and the high-speed continuous photographing is available.

Moreover, when the calculated aperture value is more open side than the predetermined aperture value, the diaphragm is controlled so as to become the calculated aperture value. Accordingly, since the "focus-and-photometry-process sensor drive" (first drive) is shifted to the "static-image sensor drive" (second drive) while keeping the calculated aperture value, the high-speed continuous photographing is available. Furthermore, when the calculated aperture value is not more open side than the predetermined aperture value, the diaphragm is controlled so as to become the predetermined aperture value. Accordingly, the focus process and photometry process are performed under the suitable condition, and the deterioration of the accuracy of the focus process is preventable. Moreover, the diaphragm 205 is controlled so as to become the calculated aperture value after the completion of the "focus-and-photometry-process sensor drive" (first drive) after performing the diaphragm control to the predetermined aperture value and before starting the "static-image sensor drive" (second drive) after performing the above-mentioned diaphragm control. Thereby, suitable exposure is securable in the static image photographing of the next frame.

Moreover, the focus control is performed during the reading of the electric charge for the static image of the N-th frame on the basis of the focus position determined for the static image of the (N+1)th frame. Thereby, since the focus control is also performed in parallel to the reading of the electric charge for the static image, time delay does not arise. Moreover, since the calculation of the aperture value for the static image photographing of the (N+1)th frame is started during the accumulation of the electric charge for the static image of the N-th frame, time delay is avoided due to the parallel operations.

Moreover, the focus position for the static image photographing is determined on the basis of the position of the object detected, and the photometry process is performed simultaneously. Thus, since the object detection results are used for both the focus calculation and photometry calculation simultaneously, the position to which is focused agrees with the position to which the exposure is adjusted, which enables to obtain the optimal image.

Figure 4:
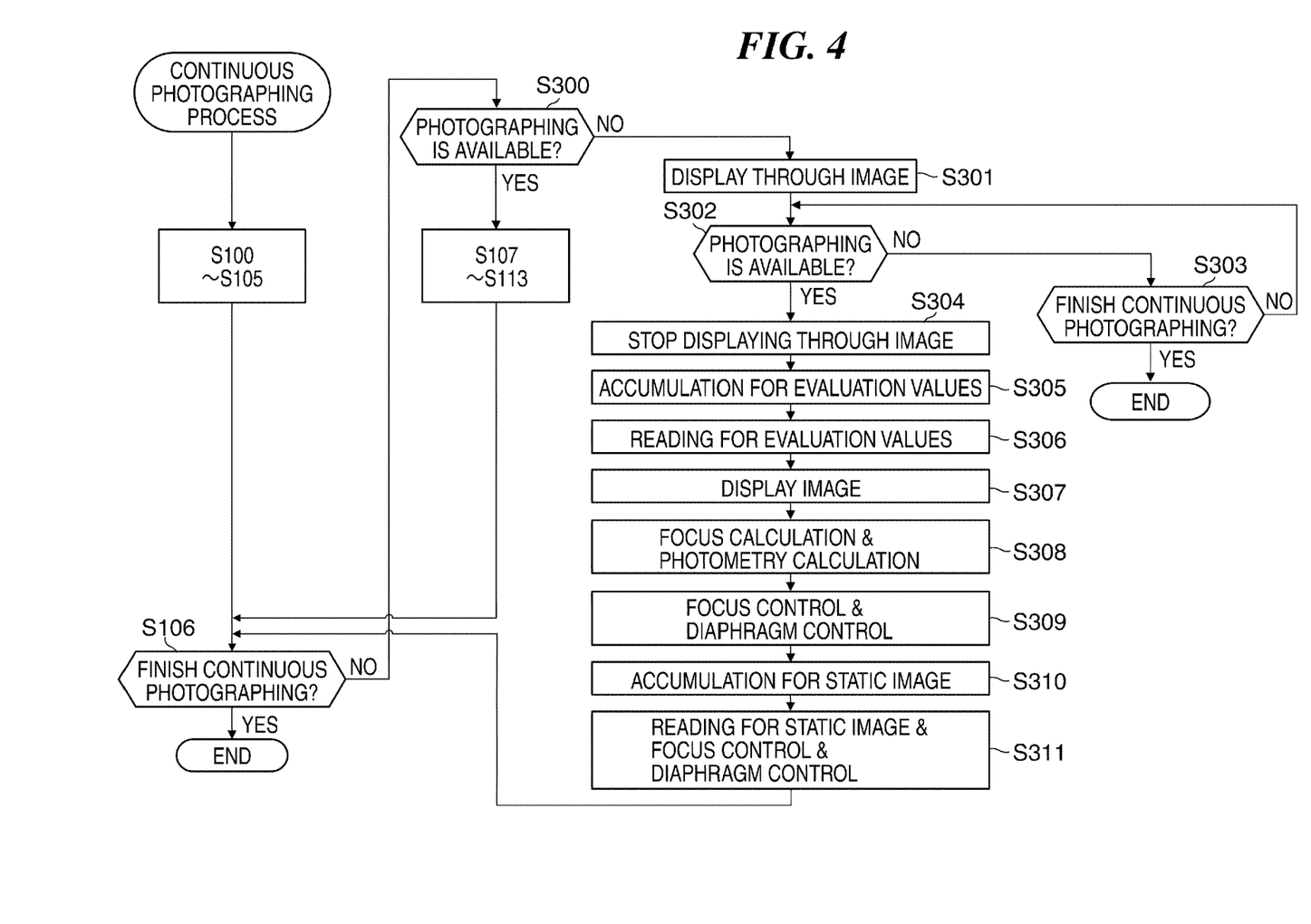
FIG. 4 is a flowchart showing a continuous photographing process performed by an image pickup apparatus according to a second embodiment of the present invention.
Figure 5:
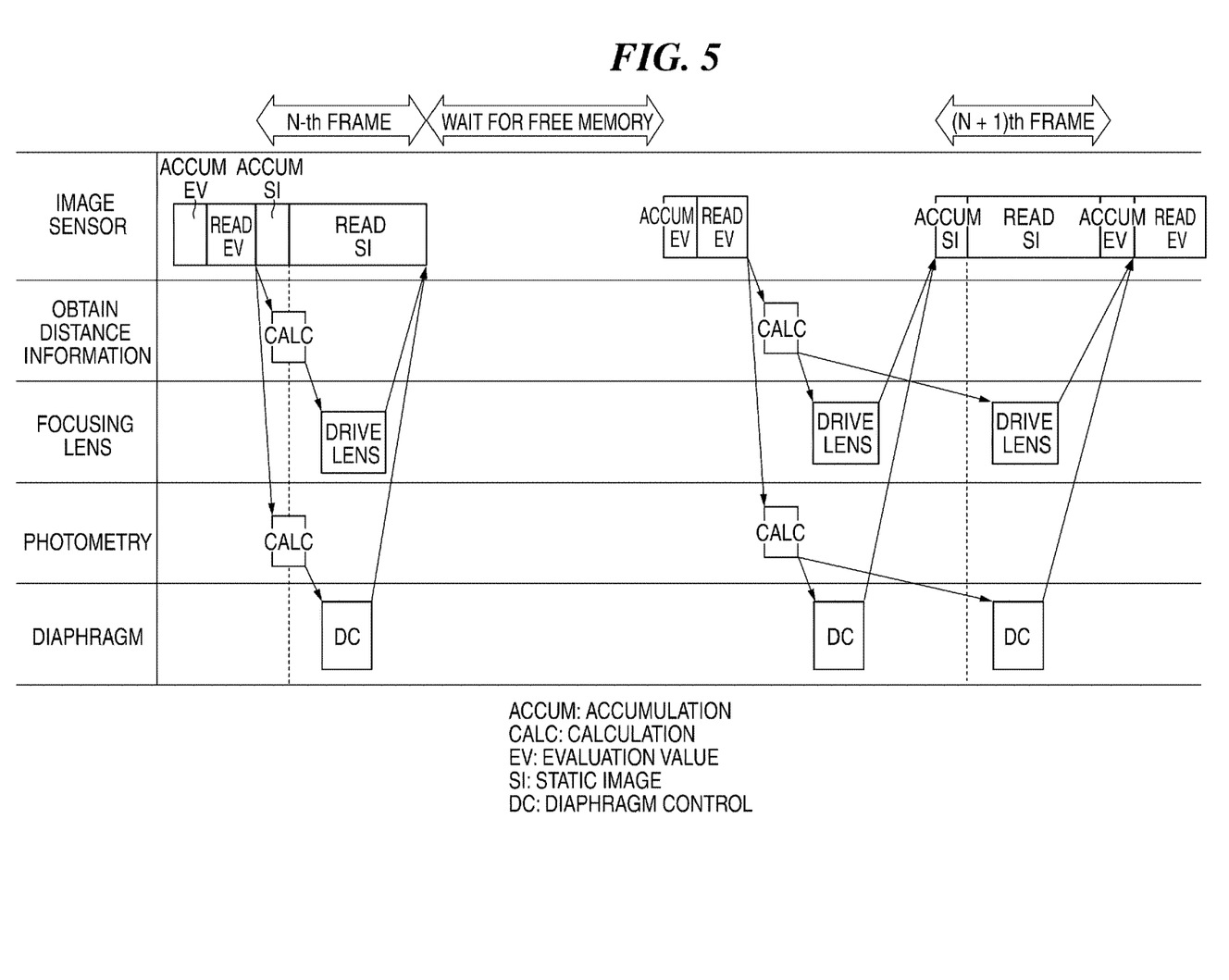
FIG. 5 is a timing chart of the continuous photographing process shown in FIG. 4.

FIG. 4 is a flowchart showing a continuous photographing process performed by an image pickup apparatus according to a second embodiment of the present invention. It should be noted that the configuration of the image pickup apparatus in the second embodiment is the same as that of the first embodiment shown in FIG. 1. FIG. 5 is a timing chart of the continuous photographing process shown in FIG. 4. An operation of the continuous photographing process in the second embodiment will be described with reference to FIG. 4 and FIG. 5. Even in the second embodiment, when photographing continuously, the system control unit 201 drives the image sensor 209 by repeating the focus-and-photometry sensor drive and the static-image sensor drive alternately.

The process of the flowchart in FIG. 4 is achieved when the CPU 221 runs the program stored in the ROM 222. When a user presses the shutter button included in the operation unit 202 in the continuous photographing mode, a start instruction of the continuous photographing is sent to each block of the image pickup apparatus 200, and the continuous photographing process in FIG. 4 is started.

The steps S100 through S105 and the steps S107 through S113 are identical to the corresponding steps described in FIG. 2. When finishing the continuous photographing in the step S106, the system control unit 201 finishes the process in FIG. 4. When not finishing the continuous photographing, the system control unit 201 proceeds with the process to step S300. In the step S300, the system control unit 201 determines whether the next static image photographing is available. When the photographing is available, the process proceeds to the step S107. When the photographing is unavailable, the process proceeds to step S301. In this time, the system control unit 201 determines whether the next static image photographing is available in the continuous photographing, i.e., whether the static-image sensor drive is available, on the basis of residual capacity of the image memory 215. When performing the continuous photographing, the image pickup apparatus 200 temporarily stores the compressed, encoded image signal for record into the image memory 215, reads the image signal concerned from the image memory 215, and writes it into the recording unit 216 sequentially. When the next image is temporarily stored into the image memory 215 before the writing of the image into the recording unit 216 is completed, the images before the writing are saved in the image memory 215. When the residual capacity of the image memory 215 becomes less than capacity required to store the next image, the static image photographing for the next frame becomes impossible. That is, the static-image sensor drive becomes impossible during the continuous photographing. Accordingly, when the residual capacity of the image memory 215 becomes less than a predetermined value, or becomes insufficient for storing the next image, it is determined that the static image photographing for the next frame is unavailable.

In the step S301, the system control unit 201 drives the image sensor 209 by the through-image sensor drive to generate images continuously at a predetermined frame rate, and starts an operation that displays through images on the display unit 214. Thereby, a framing becomes available even in a period during which the next photography is unavailable.

In step S302, the system control unit 201 determines again whether the next static image photographing became available. When the static image photographing for the next frame is not still available, the system control unit 201 proceeds with the process to step S303. In the step S303, the system control unit 201 determines whether the continuous photographing will be finished by checking whether the user is continuously pressing the shutter button of the operation unit 202. When the continuous photographing will not be finished, the system control unit 201 returns the process to the step S302. When the continuous photographing will be finished, the process in FIG. 4 is finished.

In the step S302, when the residual capacity of the image memory 215 achieves capacity required to store the next image, the system control unit 201 determines that the static image photographing for the next frame becomes available, and proceeds with the process to step S304. In the step S304, the system control unit 201 finishes the through-image sensor drive of the image sensor 209 in order to start the photographing of the next frame, and stops the through-image generation process and display process. The system control unit 201 performs the same processes as the steps S100 and S101 in the steps S305 and S306, respectively. In the next step S307, the system control unit 201 generates a display image with the image processing unit 211 from the data about the evaluation values obtained in the step S306, and displays the display image on the display unit 214.

In steps S308 through S311, the system control unit 201 performs the same process as the steps S102 through S105. However, the focus and exposure adjustment in the step S309 are performed for the static image photographing of the next frame. Moreover, in the step S311, the focus position of the object at the photographing timing of the next frame is predicted on the basis of the result of the focus process obtained in the step S308 and the result of the focus process obtained beforehand. Particularly, in the step S311, during the reading of the electric charge for the static image, the system control unit 201 controls the diaphragm 205 so as to become the aperture value suitable for obtaining the evaluation values in the next step S107 (the diaphragm control) on the basis of the result of the photometry process obtained in the step S308. The process proceeds to the step S106 after the step S311.

A particular case will be described with reference to FIG. 5. Since the residual capacity of the image memory 215 ran short after finishing the static image photographing of the N-th frame, the system control unit 201 waits until the capacity required for temporarily storing the next image is secured in the image memory 215 resulting of writing to the recording unit 216. When the required capacity is secured in the image memory 215, an image of the (N+1)th frame is photographed. However, considerable period has passed since the time of the end of photographing of the N-th frame at the timing. The focus control and diaphragm control were optimal at the timing during the reading of the static image of the N-th frame. Since the time has passed at the timing of photographing of the (N+1)th frame, a motion of the object may shift the focus and exposure largely.

Accordingly, the system control unit 201 obtains the evaluation values for the focus and photometry processes before starting the photographing of the (N+1)th frame, performs the focus calculation and photometry calculation, and completes the controls of the focusing lens 203 and diaphragm 205 on the basis of those calculated results. This enables the photographing of the (N+1)th frame after adjusting the focus and exposure optimally at the timing just before the photographing of the (N+1)th frame even when the object moved. In the example in FIG. 4, the process in the steps S305 through S309 will be performed before the step S310.

According to the second embodiment, the effect similar to the first embodiment is achievable about the focus and photometry processes that are performed under the suitable condition and the high-speed continuous photographing. Moreover, when the static-image sensor drive (the second drive) becomes available after becoming unavailable during the continuous photographing, the series of processes are performed before starting accumulation of the electric charge for the static image by the subsequent static-image sensor drive. The series of processes include the focus process, the photometry process, the calculation of the calculated aperture value, the determination of the determined aperture value, the diaphragm control, and the focus control. Accordingly, even if the object moved because a long time passed until resumption of the static-image sensor drive, it is avoidable that focus and exposure shift largely.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-164594, filed Aug. 25, 2016, which is hereby incorporated by reference herein in its entirety.

What is claimed is:

1. An image pickup apparatus comprising:
   an image sensor;
   a drive unit configured to alternately repeat a first drive, which accumulates and reads an electric charge with the image sensor in order to obtain a first image signal used for at least one of a focus process and a photometry process, and a second drive, which accumulates and reads an electric charge with the image sensor in order to obtain a second image signal which is different from the first image signal, during continuous photographing that obtains the second image signals continuously using the image sensor;
   a photometry unit including a circuit configured to perform the photometry process based on the electric charge read by the first drive of the image sensor;
   a calculation unit configured to start calculating an aperture value for obtaining the second image signal of an (N+1)th frame based on a result of the photometry process by the photometry unit during accumulation of the electric charge for obtaining the second image signal of an N-th frame by the second drive; and
   a control unit configured to control a diaphragm based on the calculated aperture value with the calculation unit and a predetermined aperture value during reading of the electric charge for obtaining the second image signal of the N-th frame by the second drive of the image sensor,
   wherein the drive unit, the calculation unit, and the control unit are provided at least in part by at least one processor configured to execute programs stored in memory.

2. The image pickup apparatus according to claim 1, wherein the first image signal is a parallax image signal.

3. The image pickup apparatus according to claim 1, wherein the control unit is configured to control the diaphragm so as to become the calculated aperture value when the calculated aperture value is more open side than the predetermined aperture value.

4. The image pickup apparatus according to claim 3, wherein the drive unit is configured to perform the second drive immediately following the first drive, when the calculated aperture value is more open side than the predetermined aperture value.

5. The image pickup apparatus according to claim 1, wherein the control unit is configured to control the diaphragm so as to become the predetermined aperture value when the calculated aperture value is not more open side than the predetermined aperture value.

6. The image pickup apparatus according to claim 5, wherein the control unit is configured to control the diaphragm so as to become the calculated aperture value after completion of the first drive after controlling the diaphragm so as to become the predetermined aperture value and before starting the second drive after controlling the diaphragm so as to become the predetermined aperture value.

7. The image pickup apparatus according to claim 1, wherein the control unit is configured to determine a focus position for obtaining the second image signal of the (N+1)th frame based on the electric charge read by the first drive of the image sensor, and controls focus based on the focus position determined during reading of the electric charge for obtaining the second image signal of the N-th frame by the second drive of the image sensor.

8. The image pickup apparatus according to claim 7,
   wherein the at least one processor is further configured to execute programs stored in the memory to provide at least in part a detection unit configured to detect an object from an image signal obtained from the image sensor,
   wherein the control unit is configured to determine the focus position for obtaining the second image signal of the (N+1)th frame based on the electric charge read by the first drive of the image sensor and a position of the object detected with the detection unit, and
   wherein the photometry unit is configured to perform the photometry process according to the electric charge read by the first drive of the image sensor and the position of the object detected.

9. The image pickup apparatus according to claim 1, wherein the control unit is configured to make a display unit display the image signal based on the electric charge read by the first drive of the image sensor as a display image.

10. The image pickup apparatus according to claim 1, wherein the photometry process with the photometry unit, the calculation of the aperture value with the calculation unit, and the diaphragm control with the control unit for obtaining the following second image signal are completed after the second drive of the image sensor becomes available after becoming unavailable during the continuous photographing and before starting accumulation of the electric charge for obtaining the following second image signal by the second drive.

11. The image pickup apparatus according to claim 10, wherein the control unit is configured to control a display to display a through image by driving the image sensor by a third drive that continuously generates images at a predetermined frame rate until the second drive of the image sensor becomes available after becoming unavailable during the continuous photographing.

12. The image pickup apparatus according to claim 10, wherein the drive unit is configured to not perform the second drive when an image signal cannot be recorded into a memory to which the second image signal obtained by the second drive is recordable as a static image.

13. A control method for an image pickup apparatus having an image sensor, the control method comprising;
performing a first drive, which accumulates and reads an electric charge with the image sensor in order to obtain a first image signal used for at least one of a focus process and a photometry process, and a second drive, which accumulates and reads an electric charge with the image sensor in order to obtain a second image signal which is different from the first image signal, alternately, during continuous photographing that obtains the second image signals continuously using the image sensor;
performing the photometry process based on the electric charge read by the first drive of the image sensor;
starting calculation of an aperture value for obtaining the second image signal of an (N+1)th frame based on a result of the photometry process during accumulation of the electric charge for obtaining the second image signal of an N-th frame by the second drive; and
controlling a diaphragm based on the aperture value calculated and a predetermined aperture value during reading of the electric charge for obtaining the second image signal of the N-th frame by the second drive.

14. A non-transitory computer-readable storage medium storing a control program causing a computer to execute a control method for an image pickup apparatus having an image sensor, the control method comprising:
performing a first drive, which accumulates and reads an electric charge with the image sensor in order to obtain a first image signal used for at least one of a focus process and a photometry process, and a second drive, which accumulates and reads an electric charge with the image sensor in order to obtain a second image signal which is different from the first image signal, alternately, during continuous photographing that obtains the second image signals continuously using the image sensor;
performing the photometry process based on the electric charge read by the first drive of the image sensor;
starting calculation of an aperture value for obtaining the second image signal of an (N+1)th frame based on a result of the photometry process during accumulation of the electric charge for obtaining the second image signal of an N-th frame by the second drive; and
controlling a diaphragm based on the aperture value calculated and a predetermined aperture value during reading of the electric charge for obtaining the second image signal of the N-th frame by the second drive.

15. An image pickup apparatus comprising:
an image sensor;
a drive unit configured to alternately perform a first drive, which accumulates and reads an electric charge with the image sensor in order to obtain a first image signal used for at least one of a focus process and a photometry process, and a second drive, which accumulates and reads an electric charge with the image sensor in order to obtain a second image signal which is different from the first image signal, during continuous photographing that obtains the second image signals continuously using the image sensor;
a photometry unit including a circuit configured to perform the photometry process based on the electric charge read by the first drive of the image sensor;
a calculation unit configured to calculate an aperture value for obtaining the second image signal of an (N+1)th frame based on a result of the photometry process by the photometry unit; and
a control unit configured to control a diaphragm based on the calculated aperture value with the calculation unit and a predetermined aperture value during reading of the electric charge for obtaining the second image signal of the N-th frame by the second drive of the image sensor,
wherein the control unit controls the diaphragm so as to become the calculated aperture value and the drive unit performs the second drive immediately after the first drive when the calculated aperture value is more open side than the predetermined aperture value,
wherein the drive unit performs the first drive after the control unit controls the diaphragm so as to become the predetermined aperture value, and then the drive unit performs the second drive after the control unit controls the diaphragm so as to become the calculated aperture value, when the calculated aperture value is not more open side than the predetermined aperture value, and
wherein the drive unit, the calculation unit, and the control unit are provided at least in part by at least one processor configured to execute programs stored in memory.

16. A control method for an image pickup apparatus having an image sensor, the control method comprising;
performing a first drive, which accumulates and reads an electric charge with the image sensor in order to obtain a first image signal used for at least one of a focus process and a photometry process, and a second drive, which accumulates and reads an electric charge with the image sensor in order to obtain a second image signal which is different from the first image signal, during continuous photographing that obtains the second image signals continuously using the image sensor;
performing the photometry process based on the electric charge read by the first drive of the image sensor;
calculating an aperture value for obtaining the second image signal of an (N+1)th frame based on a result of the photometry process;
controlling a diaphragm so as to become the calculated aperture value during reading of the electric charge for obtaining the second image signal of an N-th frame by the second drive of the image sensor;
performing the second drive immediately after the first drive, when the calculated aperture value is more open side than the predetermined aperture value; and
performing the first drive after controlling the diaphragm so as to become the predetermined aperture value during reading of the electric charge for obtaining the second image signal of an N-th frame by the second drive of the image sensor, and then performing the second drive after controlling the diaphragm so as to become the calculated aperture value, when the calculated aperture value is not more open side than the predetermined aperture value.

17. A non-transitory computer-readable storage medium storing a control program causing a computer to execute a control method for an image pickup apparatus having an image sensor, the control method comprising:
performing a first drive, which accumulates and reads an electric charge with the image sensor in order to obtain a first image signal used for at least one of a focus process and a photometry process, and a second drive, which accumulates and reads an electric charge with the image sensor in order to obtain a second image signal which is different from the first image signal, during continuous photographing that obtains the second image signals continuously using the image sensor;

performing the photometry process based on the electric charge read by the first drive of the image sensor;

calculating an aperture value for obtaining the second image signal of an (N+1)th frame based on a result of the photometry process;

controlling a diaphragm so as to become the calculated aperture value during reading of the electric charge for obtaining the second image signal of an N-th frame by the second drive of the image sensor, and performing the second drive immediately after the first drive, when the calculated aperture value is more open side than the predetermined aperture value, and performing the first drive after controlling the diaphragm so as to become the predetermined aperture value during reading of the electric charge for obtaining the second image signal of an N-th frame by the second drive of the image sensor, and then performing the second drive after controlling the diaphragm so as to become the calculated aperture value, when the calculated aperture value is not more open side than the predetermined aperture value.

* * * * *